Sept. 10, 1935. J. WIESMAN 2,013,776
FILTER FOR DRY CLEANING SOLUTIONS
Filed Jan. 15, 1934 3 Sheets-Sheet 1
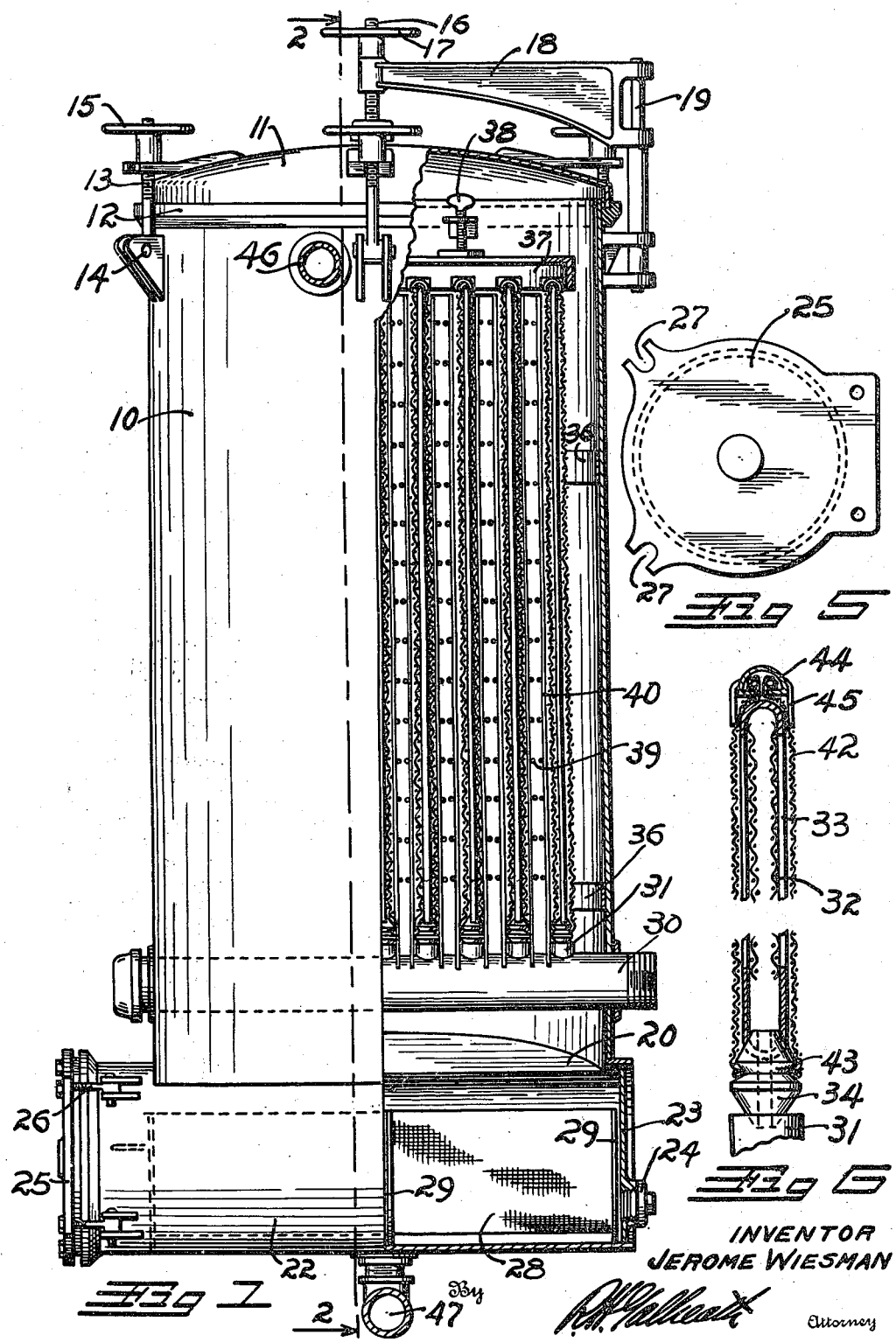
INVENTOR
JEROME WIESMAN
Attorney Sept. 10, 1935.  J. WIESMAN  2,013,776
FILTER FOR DRY CLEANING SOLUTIONS
Filed Jan. 15, 1934   3 Sheets—Sheet 2
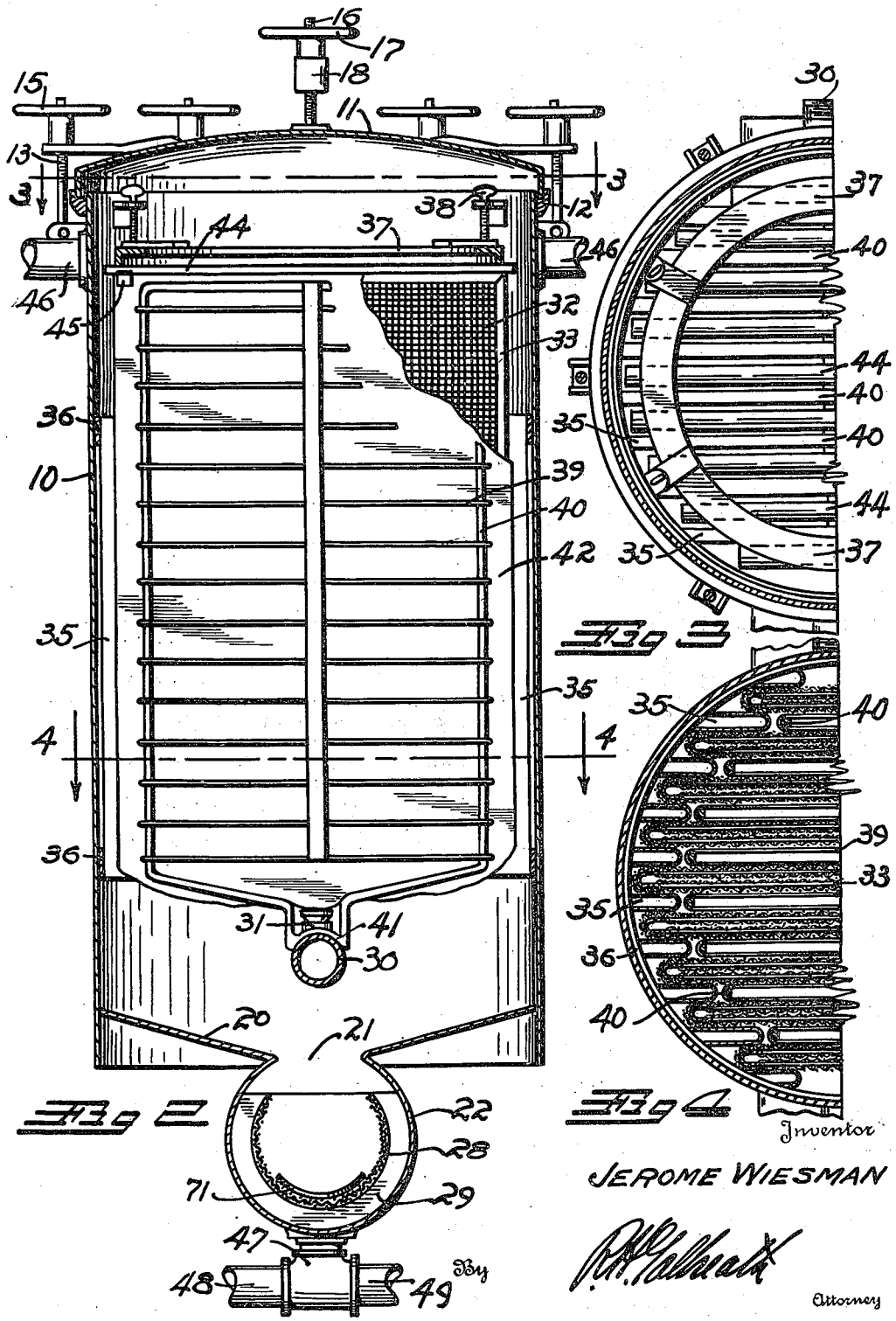

Inventor
JEROME WIESMAN

Patented Sept. 10, 1935

2,013,776

UNITED STATES PATENT OFFICE 2,013,776

FILTER FOR DRY CLEANING SOLUTIONS

Jerome Wiesman, Denver, Colo.

Application January 15, 1934, Serial No. 706,651

5 Claims. (Cl. 210—182)

This invention relates to a filter for dry cleaning solutions and has for its principal object the provision of a device of this character which will have an unusually high efficiency; which will be efficiently adaptable for back washing so that it may be quickly cleaned without necessity for removing the filter screens and cloths.

Another object is to so construct the filter that the solvent can first flow from the bottom upward so as to raise and bank all floating material and filtering compounds on the filter surfaces; thence can flow downward to permit all floating and non-floating material to deposit in an easily cleaned trap.

Other objects and advantages resides in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a side elevation, partly in section, of the improved filter.

Fig. 2 is a vertical section therethrough, taken on the line 2—2, Fig. 1.

Fig. 3 is a fragmentary horizontal section taken on the line 3—3, Fig. 2.

Fig. 4 is a similar section taken on the line 4—4, Fig. 2.

Fig. 5 is a detail view of the cleanout door employed in the filter.

Fig. 6 is an enlarged fragmentary vertical section through one of the filter elements.

Figure 7:
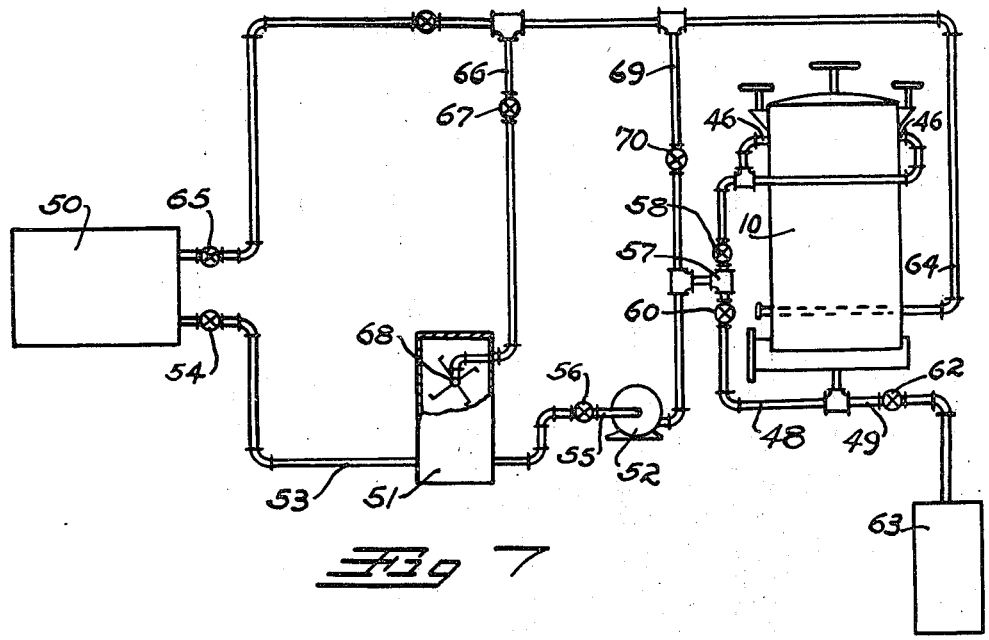
Fig. 7 is a flow diagram illustrating the preferred method of connecting and installing the improved filter.

The invention comprises, a vertical, preferably cylindrical, tank, 10, closed at its top by means of a removable liquid tight lid 11 which fits into a peripheral sealing flange 12 about the tank. The lid is clamped to the tank 10 by means of suitable clamp bolts 13 which are hinged to the tank 14 and provided with suitable clamping nuts 15. The lid 11 may be lifted from the tank by means of a jack screw 16 and nut 17. The screw 16 is secured to the center of the lid 11 and passes through a swinging bracket 18 pivoted upon a suitable vertical standard 19 extending upwardly from the tank. By this arrangement, the lid can be lifted from the tank and swung to one side during cleaning or replacing operations.

The tank is provided with an oppositely inclined bottom 20. A horizontal cylindrical sediment receiver 22 is positioned below a sediment slot 21 which extends across and through the middle of the bottom 20. One extremity of the receiver 22 is permanently closed at 23 and may be provided with a suitable wash-out plug 24. The other extremity is closed by means of a swinging clean-out door 25 secured thereon upon hinged clamp bolts 26. Two of the clamp bolts 26 pass into suitable receiving notches 27 so that they may be swung from place to allow the door to be swung open upon the remaining clamp bolts.

A trough-shaped, sediment screen 28 is slidably positioned in the receiver 22 so as to receive material from the sediment slot 21. The screen 28 is of lesser diameter than the interior of the receiver 22 and is supported therein upon surrounding scraping flanges 29.

A horizontal manifold pipe 30 extends diametrically across the tank 10 near the bottom thereof. The manifold pipe is provided with a series of spaced-apart, upwardly-extending, nipples 31 for receiving filtering screens. The screens are designated in their entirety by the numeral 32 and consist of a channel screen frame 33 with two or more wire cloth screens soldered or otherwise secured around their edges therein. The bottom of each frame 33 inclines to a fitting 34 to which it is soldered or otherwise secured. The fittings 34 are formed, as shown in Fig. 6, with a conical top which is fitted into and secured to the screen frame 32 and with a conical bottom which rests in the nipple 31.

The screens 32 are maintained in their proper vertical spaced positions by means of inwardly-extending, guide members 35 on the interior of the tank 10. The guide members are preferably formed of U-shaped sheet metal secured to spacing bands 36, which are in turn secured to the inner wall of the tank 10. The screens 32 are held down in the tank so as to seal their fittings 34 to the nipples 31 by means of a pressure ring 37 which may be suitably notched, as shown in Fig. 1, to fit over the individual screens. The pressure ring may be clamped downwardly against the screens by means of pressure screws 38. Separators 39 are positioned between each pair of the screens 32. These separators preferably consist of a series of horizontal flat wire loops extending about a separator frame 40, the bottom of which extends downwardly to provide a seat 41 to rest upon the manifold 30.

In use, cloth filter bags 42 are drawn upwardly over each of the screen frames 33. These bags are provided with a round hole in the bottom through which the fittings 34 project. It will be noted that the fittings are grooved as shown at 43 so that the edges of this hole may fit snugly therein. The tops of the bags are corded around their openings so that they may be clamped closed by means of a slide member 44, as shown in Fig. 6.

The slide member 44 is formed of a hollow metallic channel preferably having a rounded top and a flat bottom, the bottom having a longitudinal split which allows the entire member to be slid along the open bag top so as to clamp the corded openings together. Ears 45 are formed upon the slide members to maintain them in proper upright position on top of the screen frames 33. The tank 10 is oppositely flanged or fitted at the top for receiving supply pipes 46 and the bottom of the receiver 22 is flanged or fitted for receiving a T fitting 47.

The preferred method of connecting the filter in a cleaning solution circuit is illustrated diagrammatically in Fig. 7. In this view a typical washer is diagrammed at 50, a mixing tank at 51, and a solvent pump at 52. The washer is connected with a mixing tank by means of a pipe 53 controlled by a valve 54. The pump 52 is connected with the mixing tank through a valve 56 by means of a pipe 55. The two supply pipes 46 are connected together and lead to a T 57 through a valve 58. The T is also connected by a pipe 48 with the fitting 47 on the bottom of the receiver 22 through a valve 60. One branch of the fitting 47 leads to a discharge pipe 49 through a valve 62 for draining solution to a suitable muck tank 63. The manifold 30 is connected by means of a pipe 64 through a valve 65 with the washer 50. A by-pass pipe 66, controlled by a valve 67, leads to an agitator 68 in the mixing tank 51.

Operation

In starting, the solution is passed through the by-pass pipe 66 and the mixing tank 51 until the proper pressure and mixture is reached. It is then ready to be placed in circuit with the washer. It is preferred during the first cycle of operation to pass the solvent from the washer through the pipe 53, the mixing tank 51, the pump 52, and the pipe 48 to the fitting 47 at the bottom of the receiver 22. From thence it flows upwardly through and around the sediment screen 28 and between the filter screens 32, thence through the filter bags to the pipe 64 and back to the washer 50. At this time the valves 58, 67, 70 and 62 are closed.

This upward flow in the filter tank causes a turbulence which keeps the floatable material and filtering compounds in suspension and spreads and packs them evenly over the filtering surfaces so that a perfect filtering medium is formed. After a period of operation, say half a day, the valve 60 is closed and the valve 58 is opened. The incoming solvent now flows downwardly through the filter between the screens 32. This downward current allows all floating and non-floating particles to settle toward the bottom of the tank and into the sediment screen 28. The operation is continued in this direction for another period, say the remainder of the working day. At the close of the day, the valves 58, 60 and 65 are closed and the valves 62 and 70 are opened allowing the contents of the tank to drain into the muck tank 63. The solution from the washer 50 and mixing tank 51 is now reversed through the pipes 69 and 64 to the manifold 30 and into the interior of the filter bags. This causes them to expand against the separators 39 and loosens all adhering filtering compounds and solids which flow to the bottom with the current to the sediment screen 28. The tank can be given a final washing by manipulating the valves to provide a flow from any point in any desired directions.

The clean-out door 68 can then be opened and the sediment screen 28 withdrawn. As it is withdrawn the scraping flanges 29 will effectively wipe or scrape all deposited sediment from the receiver 22. The screen can then be easily cleaned and washed and returned. Owing to the reverse downward flow the screen 28 will contain absolutely all material filtered from the solution. The agitator shown at 68 in the mixing tank is described in applicant's Patents Nos. 1,820,334 and 1,658,697.

Figure 8:
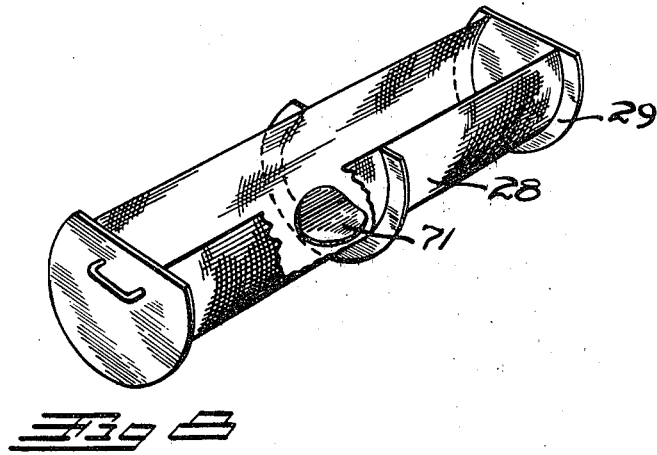
Fig. 8 is a perspective view of the removable trough-shaped screen showing scraping flanges and baffle plate.

It will be noted that two of the scraping flanges 29 are formed by projection of the front and back plates of the screen 28 and that the middle scraping flange is a semi-circular member surrounding the screen. This middle flange, when in place in the receiver, rests directly over the opening to the fitting 47 so that it acts to divide the incoming flow and distribute it toward both extremities of the screen. It has been found advantageous to also secure a baffle plate 71 in the bottom center of the screen as shown in Fig. 8 so as to still further distribute the incoming solution and prevent it from rising as a single column in the tank.

It will be noted that the separators 39 prevent the adjacent bags from coming in contact with each other during the reverse or back washing operation.

It will be noted that during the initial by-passing operation, the entire pressure of the pump is directed through the agitator 68 in the mixing tank 51. This causes the agitator to violently rotate so as to attain a complete and efficient mixture of the solution and any bleaching or filtering compounds which may be added thereto.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A filter comprising: a vertical tank; a manifold extending diametrically across said tank near the bottom thereof; spaced apart nipples opening upwardly from said manifold; filtering screens resting upon and communicating with said nipples, there being a lateral opening in the bottom of said tank below said screens; a horizontally positioned settling chamber communicating with said tank through said opening; a removable trough-shaped screen in said settling chamber, said screen being spaced from the wall of said settling chamber; three scraping flanges surrounding said screen and maintaining it in spaced relation with said chamber, one of said scraping flanges being mounted in the middle of said trough-shaped screen; an opening centrally located in the bottom of said settling chamber; and a baffle plate mounted in the middle of the bottom of said trough-shaped screen which in conjunction with said centrally located flange acts to distribute the incoming solution and prevents it from rising as a single column in the tank.

2. A filter comprising: a vertical tank; a manifold extending diametrically across said tank near the bottom thereof; spaced apart nipples opening upwardly from said manifold; filtering screens resting upon and communicating with said nipples, there being a lateral opening in the bottom of said tank below said screens; a horizontally positioned settling chamber communicating with said tank through said opening; a removable trough-shaped screen in said settling chamber, said screen being spaced from the wall of said settling chamber; and scraping flanges surrounding said screen and maintaining it in spaced relation with said chamber.

3. A filter comprising: a vertical tank; a manifold extending diametrically across said tank near the bottom thereof; spaced apart nipples opening upwardly from said manifold; filtering screens resting upon and communicating with said nipples, there being a lateral opening in the bottom of said tank below said screens; a horizontally positioned settling chamber communicating with said tank through said opening; a removable trough-shaped screen in said settling chamber, said screen being spaced from the wall of said settling chamber; scraping flanges surrounding said screen and maintaining it in spaced relation with said chamber, and a hinged door at one extremity of said chamber through which said screen may be pulled so as to cause said flanges to scrape material from said chamber.

4. A filter comprising: a vertical tank; a manifold extending diametrically across said tank near the bottom thereof; spaced apart nipples opening upwardly from said manifold; filtering screens resting upon and communicating with said nipples, there being a lateral opening in the bottom of said tank below said screens; a horizontally positioned settling chamber communicating with said tank through said opening; a removable trough-shaped screen in said settling chamber, said screen being spaced from the wall of said settling chamber; scraping flanges surrounding said screen and maintaining it in spaced relation with said chamber; and a pipe communicating through the bottom of said settling chamber so that solution may be passed into or out of the space between said settling screen and said settling chamber.

5. A filter comprising: a vertical tank; a manifold extending diametrically across said tank near the bottom thereof; spaced apart nipples opening upwardly from said manifold; filtering screens resting upon and communicating with said nipples, there being a lateral opening in the bottom of said tank below said screens; a horizontally positioned settling chamber communicating with said tank through said opening, each of said screens having a conical fitting at its bottom arranged to extend into a nipple on said manifold; means for clamping said screens downwardly so as to seal said fittings and nipples together; a removable trough-shaped screen in said settling chamber; said screen being spaced from the wall of said settling chamber; and scraping flanges surrounding said screen and maintaining it in spaced relation with said chamber.

JEROME WIESMAN.